United States Patent [19]
Yokoi et al.

[11] Patent Number: 5,403,169
[45] Date of Patent: Apr. 4, 1995

[54] PLUNGER PUMP

[75] Inventors: Keiji Yokoi, Tokyo; Yoshio Minami, Kanagawa, both of Japan

[73] Assignee: Ebara Corporation, Tokyo, Japan

[21] Appl. No.: 283,189

[22] Filed: Aug. 4, 1994

Related U.S. Application Data

[63] Continuation of Ser. No. 39,995, Mar. 30, 1993, abandoned.

[30] Foreign Application Priority Data

Mar. 31, 1992 [JP] Japan ................. 4-105376

[51] Int. Cl.⁶ .................... F04B 21/00; F16J 15/32
[52] U.S. Cl. ......................... 417/568; 417/571; 277/59; 277/164; 277/205
[58] Field of Search ............ 417/568, 571, 401, 403; 277/205, 58, 59, 140, 164

[56] References Cited

U.S. PATENT DOCUMENTS

| | | | |
|---|---|---|---|
| 2,979,350 | 4/1961 | Lansky | 277/59 |
| 3,216,651 | 11/1965 | King et al. | 417/401 |
| 3,595,585 | 7/1971 | Bristow | 277/58 |
| 3,834,715 | 9/1974 | Butler | 277/59 |
| 4,093,240 | 6/1978 | Masuda et al. | 277/59 |
| 4,386,782 | 6/1983 | Reverberi | 277/59 |
| 4,508,356 | 4/1985 | Janian | 277/164 |
| 4,655,462 | 4/1987 | Balsells | 277/164 |
| 4,706,970 | 11/1987 | Ramirez | 277/205 |
| 4,991,858 | 2/1991 | Abila et al. | 277/205 |
| 5,092,609 | 3/1992 | Balzano et al. | 277/59 |

FOREIGN PATENT DOCUMENTS

| | | | |
|---|---|---|---|
| 1339362 | 12/1963 | France | 417/568 |
| 2214320 | 10/1973 | Germany | 277/59 |
| 63-266176 | 11/1988 | Japan | |
| 1058192 | 2/1987 | United Kingdom | 277/59 |

*Primary Examiner*—Richard A. Bertsch
*Assistant Examiner*—Roland G. McAndrews, Jr.
*Attorney, Agent, or Firm*—Wenderoth, Lind & Ponack

[57] ABSTRACT

In a plunger pump having a pump chamber delimited by a cylinder and a plunger reciprocating in the cylinder, and a first seal member provided between an inner surface of the cylinder and an outer surface of a plunger to prevent a liquid in the pump chamber from leaking to the outside, the inner surface of the cylinder and the outer surface of the plunger are out of sliding contact with each other, and a second seal member is interposed between the first seal member and the pump chamber. During a suction stroke, the second seal member is in sliding contact with the outer surface of the plunger to prevent dust, which is produced as the result of wear, from flowing to the pump chamber from the first seal member side. During a discharge stroke, a minute gap is formed between the second seal member and the outer surface of the plunger. A first discharge system is provided between the second seal member and the first seal member for discharging to the outside any liquid flowing from the pump chamber past the second seal member. The pump liquid is thus prevented from being contaminated with the dust.

14 Claims, 4 Drawing Sheets

PLUNGER PUMP

This application is a continuation of now abandoned application Ser. No. 08/039,995, filed Mar. 30, 1993.

BACKGROUND OF THE INVENTION

1. Field of the Invention

The present invention relates to a plunger pump and, more particularly, to a plunger pump which may be employed as a jet scrubber in semiconductor manufacturing equipment.

2. Prior Art

Plunger pumps are arranged to pressurize a liquid drawn in through a suction opening and discharge it from a discharge opening under high pressure. FIGS. 4 and 5 show the internal structure of a conventional plunger pump. As illustrated, a plunger 2 of a plunger pump P is connected to a pneumatic piston 4 that moves a cylinder 3. As the pneumatic piston 4 reciprocates in response to air pressure $a_1$ and $b_1$ supplied from air supply ports 5 and 6, the plunger 2 also reciprocates in a cylinder 7 having a cylinder head. Thus, a suction stroke and a discharge stroke are repeated, so that a liquid sucked in from a suction opening d is pressurized in a pump chamber C and then discharged from a discharge opening e. To prevent the liquid, which is pressurized at a high level by the plunger 2 in the pump chamber C, from leaking to the air cylinder 3 through the outer peripheral surface of the plunger 2, a seal member 8 having a U-shaped cross section is provided on the inner periphery of the cylinder 7 to thereby seal the area between the cylinder 7 and the plunger 2, as shown in FIGS. 4 and 5. The seal member 8 is secured in a predetermined position by mounting members 9 and 10, which are provided on the inner periphery of the cylinder 7. The seal member 8 comes into pressing contact with the plunger 2 and the cylinder 7, particularly when the pressure in the pump chamber C is high, thereby preventing the liquid from leaking to the outside.

The conventional plunger pump, as shown in FIG. 4, suffers, however, from the problem that when the plunger 2 reciprocates in the cylinder 7 while in sliding contact with the seal member 8, minutes dust particles are generated by friction between the seal member 8 and the plunger 2 which causes these members to wear, and the resulting dust particles may enter the pump chamber C and comingle with the liquid to be delivered.

In particular, when the plunger pump is employed as a jet scrubber in semiconductor manufacturing equipment, minute dust particles mixed in the liquid are blown on a semiconductor substrate and attached thereto as foreign matter, which causes an adverse effect on the yield of semiconductor products made from the semiconductor substrate.

In addition, if, as shown in FIG. 5, such dust particles 11 gather on the liquid side (the side denoted by reference numeral 12) of the seal member 8, the dust 11 may wedge into the area between a lip 13 of the seal member 8 and the outer peripheral surface of the plunger 2, degrading the performance of the seal member 8. In addition, there is another problem in that the dust 11, which has gathered at the lip 13, may adhere to the surface of the plunger 2 and enter the pump chamber C during the discharge stroke, resulting in foreign matter being mixed in the liquid to be delivered.

SUMMARY OF THE INVENTION

In view of the above-described circumstances, it is an object of the present invention to provide an improved plunger pump in which the liquid delivered is not contaminated with dust generated in the area of sliding contact between the seal member and the plunger.

To attain the above-described object, the present invention provides a plunger pump having a pump chamber delimited by a cylinder and a plunger reciprocating in the cylinder, and a first seal member provided between the inner surface of the cylinder and the outer surface of the plunger to prevent a liquid in the pump chamber from leaking to the outside. However, the inner surface of the cylinder and the outer surface of the plunger are not in sliding contact with each other. A second seal member is interposed between the first seal member and the pump chamber so that during the suction stroke, the second seal member is in sliding contact with the outer surface of the plunger to prevent dust, which results from wear, from flowing to the pump chamber from the first seal member side, whereas during the discharge stroke, a minute gap is formed between the second seal member and the outer surface of the plunger. The plunger pump further includes first discharge means provided between the second seal member and the first seal member for discharging to the outside the liquid flowing out from the pump chamber through the second seal member.

Preferably, the plunger pump further includes second discharge means capable of being opened and closed under control so that when it is opened, the second discharge means communicates with the pump chamber to discharge the liquid from the pump chamber.

In the present invention, during the discharge stroke of the pump the greater part of the liquid that is pressurized in the pump chamber is discharged from the discharge opening of the pump. However, part of the remaining liquid presses against a lip of the second seal member, which is provided between the cylinder and the plunger, and forms a minute gap between the plunger and the lip while flowing toward the first seal member through the minute gap. Thus, the liquid residing in the area between the first and second seal members is discharged to the outside by the first discharge means. Thus, there is no possibility that dust generated at the high-pressure seal will enter the liquid to be delivered during either the suction or discharge strokes of the pump. In addition, since there is no likelihood that dust generated at the high-pressure seal will wedge into the seal member, the performance of the seal member will not be degraded.

If a second discharge means that can communicate with the pump chamber to discharge the liquid from the pump chamber is provided in the cylinder, and the second discharge means is opened to communicate with the pump chamber during the suspension of the operation of the pump, the liquid is discharged to the outside from the second discharge means through the pump chamber under the pressure in the line connected to the suction opening of the pump. This enables a fresh, clean high-pressure liquid to be immediately supplied even after the pump has been out of use for a long period of time.

The above and other objects, features and advantages of the present invention will become more apparent from the following description when taken in conjunction with the accompanying drawings in which a pre-

DETAILED DESCRIPTION OF THE INVENTION

One embodiment of the present invention will be described below with reference to FIGS. 1 to 3.

Figure 1:
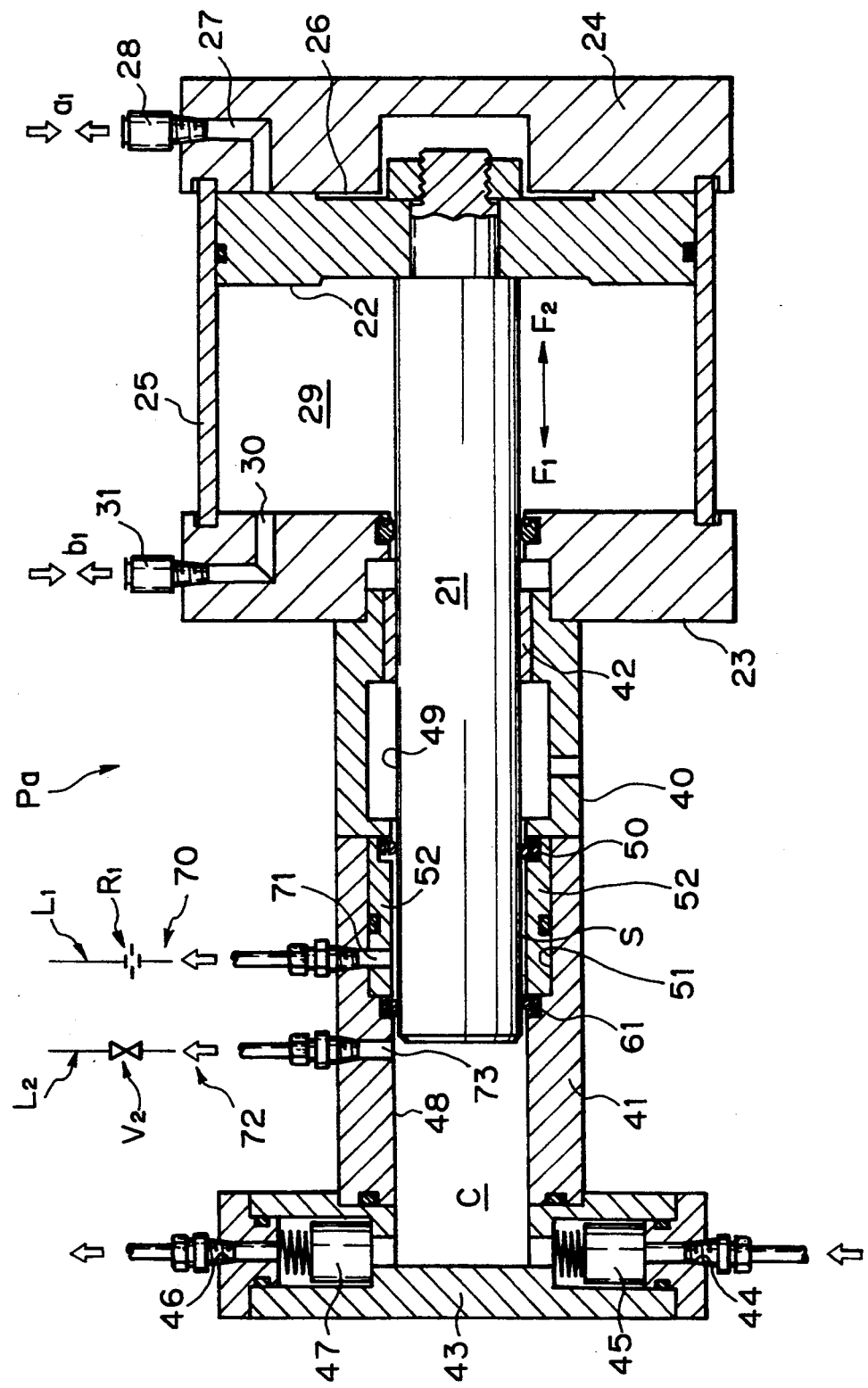
FIG. 1 is a longitudinal sectional view of one embodiment of the plunger pump according to the present invention.
Figure 2:
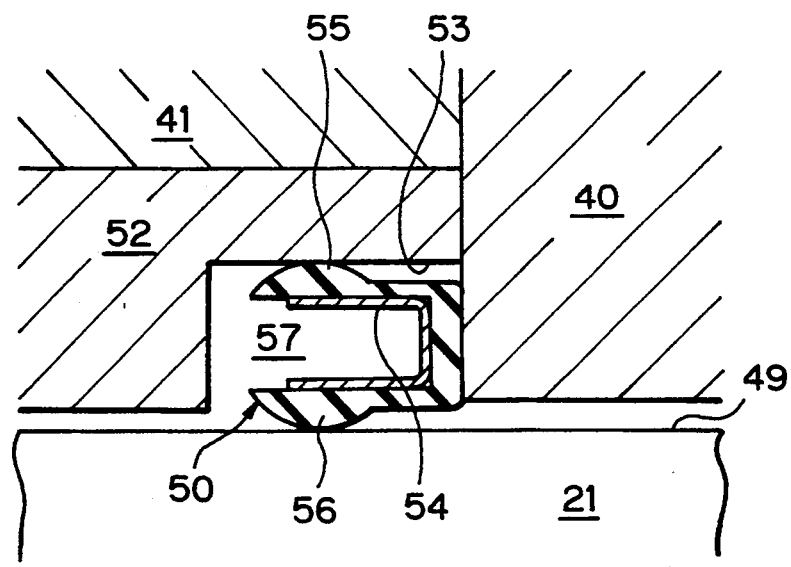
FIG. 2 is an enlarged sectional view of a part of the plunger pump shown in FIG. 1.

FIG. 1 shows the internal structure of a plunger pump Pa according to the present invention. The plunger pump Pa is used to clean, for example, the surface of a semiconductor substrate, a wafer, etc. with a high-pressure liquid jetted out from a nozzle. Therefore, a liquid (mainly pure water) drawn in must be discharged from the pump with a desired level of cleanliness being maintained. As illustrated in the figure, one end of a plunger 21 is connected to a pneumatic piston 22. The pneumatic piston 22 reciprocates in a cylinder 25 which is supported by a body-side flange 23 and a flange 24 so as to form a sealed structure therewith.

One chamber 26 that is defined in the cylinder 25 by the pneumatic piston 22 communicates with a working air supply port 28 through a passage 27 formed in the flange 24. The other chamber 29, which is defined in the cylinder 25 by the pneumatic piston 22, communicates with a working air supply port 31 through a passage 30 formed in the body-side flange 23. Accordingly, as working air $a_1$ flows into the first chamber 26 through the working air supply port 28 and the passage 27 and working air $b_1$ in the second chamber 29 is discharged to the outside through the passage 30 and the working air supply port 31, the pneumatic piston 22 slides toward the body-side flange 23 (in the direction of the arrow $F_1$ in the figure) in the cylinder 25. Next, as the working air $b_1$ flows into the chamber 29 through the working air supply port 31 and the passage 30 and the working air $a_1$ is discharged to the outside through the passage 27 and the working air supply port 28, the pneumatic piston 22 slides toward the flange 24 (in the direction of the arrow $F_2$ in the figure) in the cylinder 25. By repeating such an operation, the piston 22 reciprocates in the axial direction.

The plunger 21 is axially movably supported by a bearing 42 attached to a cylindrical bearing casing 40. The plunger 21 reciprocates axially in a cylinder 41 in response to the reciprocating motion of the pneumatic piston 22. A cylinder head 43 is attached to one end of the cylinder 41. The cylinder 41 having the cylinder head 43 and the plunger 21 define a pump chamber C.

The cylinder head 43 is formed with a suction opening 44 that communicates with the pump chamber C to supply it with a liquid to be delivered. The suction opening 44 has a suction-side check valve 45 in the flow path thereof in order to prevent a back-flow of the liquid during the discharge stroke. Further, the cylinder head 43 is formed with a discharge opening 46 for discharging the liquid pressurized in the pump chamber C by the plunger 21. The discharge opening 46 has a discharge-side check valve 47 in the flow path thereof in order to prevent a back-flow of the liquid during the suction stroke.

The plunger 21, which is connected to the pneumatic piston 22, reciprocates in the cylinder 41 in response to the reciprocating motion of the piston 22 caused by the working air $a_1$ and $b_2$. During the suction stroke, the plunger 21 moves in the direction of the arrow $F_2$. At this time, the suction-side check valve 45 opens while the discharge-side check valve 47 is closed. Thus, the liquid is sucked into the pump chamber C through the suction opening 44. During the discharge stroke, on the other hand, the plunger 21 moves in the direction of the arrow $F_1$. Consequently, the liquid in the pump chamber C is pressurized, and at this time, the suction-side check valve 45 is closed while the discharge-side check valve 47 opens. Thus, the liquid in the pump chamber C is discharged from the discharge opening 46. By repeating such suction and discharge strokes, the plunger pump Pa pressurizes a relatively low-pressure liquid, which is supplied from the suction opening 44, to a predetermined level of pressure and discharges it from the discharge opening 46. It should be noted that FIG. 1 shows the pump Pa in a state where the pneumatic piston 22 is in contact with the air flange 24 at the right-hand end, that is, the suction stroke has been completed, and the pump Pa is about the shift to the discharge stroke.

A minute gap is formed between the inner periphery 48 of the cylinder 41 and the outer peripheral surface 49 of the plunger 21. In addition, an annular first seal member 50, which has a U-shaped cross section, is interposed between the inner periphery 48 and the outer peripheral surface 49 in order to prevent the liquid in the pump chamber C from leaking to the outside. The cylinder 41 has a stepped portion 51 at the inner periphery 48 thereof, the stepped portion being defined in part by an inner peripheral surface of the cylinder 41 having a relatively large diameter. A cylindrical packing casing 52 is mounted on said peripheral surface of the stepped portion 51 in a sealed state. The seal member 50 is immovably accommodated in a recess that is defined by the bearing casing 40 and a recessed portion 53 of the inner periphery of the packing casing 52. The seal member 50 is formed of a synthetic resin having good slip properties, e.g., a PTFE resin. A spring 54 which also has a U-shaped cross section is attached to the inner side of the seal member 50 so that two lips 55 and 56 are pressed by a relatively weak force against the packing casing 52 and the outer peripheral surface 49 of the plunger 49, respectively. Thus, the plunger 21 slides while being in contact with the lip 56. The seal member 50 is set in position with an opening 57 thereof facing toward the pump chamber C. Accordingly, when the liquid in the pump chamber C is pressurized by the plunger 21, the high-pressure liquid flows toward the opening 57 and acts on the seal member 50 so as to enlarge the opening 57. Therefore, no liquid leaks out through the area between the lip 56 and the plunger 21.

In addition, a dust wiper 61 as a second seal member is interposed between the inner periphery 48 of the cylinder 41 and the outer peripheral surface 49 of the plunger at a position closer to the pump chamber C than the seal member 50. The dust wiper 61 is slidably contacted by the plunger 21. During the suction stroke of the pump, the dust wiper 61 slidably contacts the outer peripheral surface 49 of the plunger so as to prevent dust generated by wear at the seal member 50 from flowing into the pump chamber C, whereas, during the discharge stroke, a minute gap will form between the dust wiper 61 and the outer peripheral surface 49 of the plunger.

Figure 3:
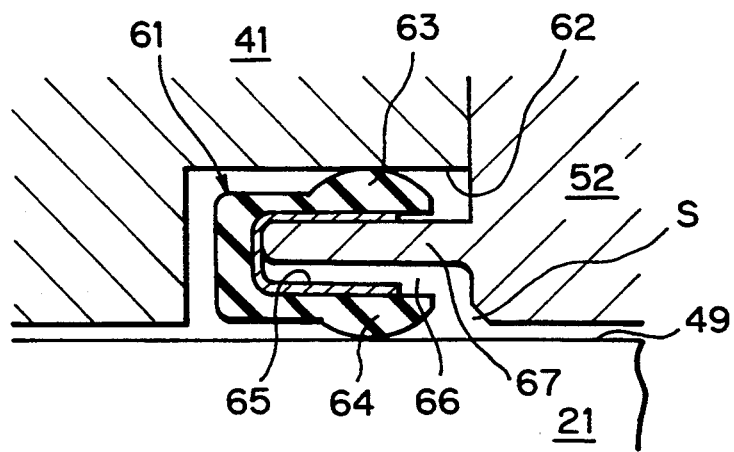
FIG. 3 is an enlarged sectional view of a part of the plunger pump shown in FIG. 1.
Figure 4:
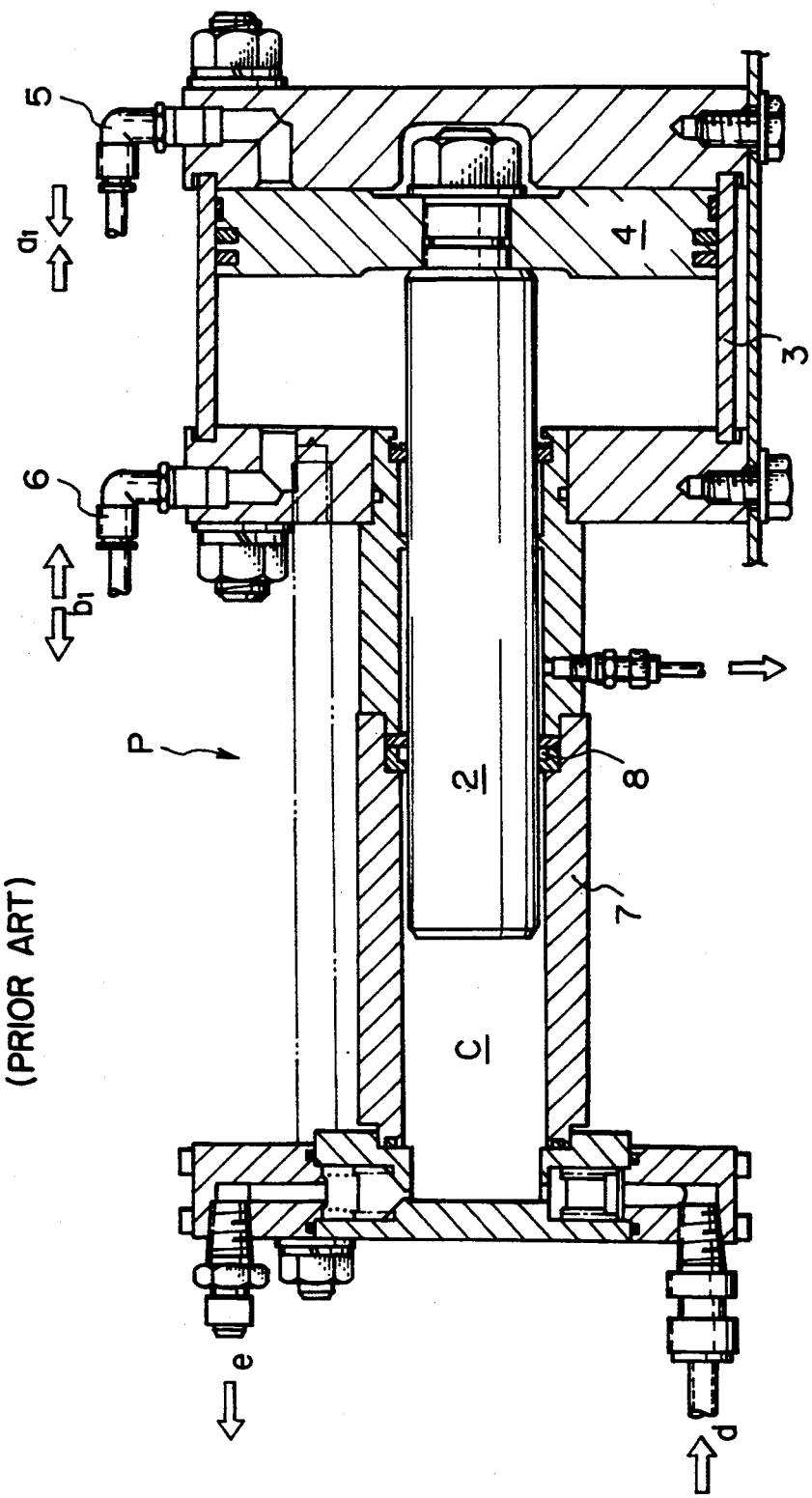
FIG. 4 is a longitudinal sectional view of a conventional plunger pump.
Figure 5:
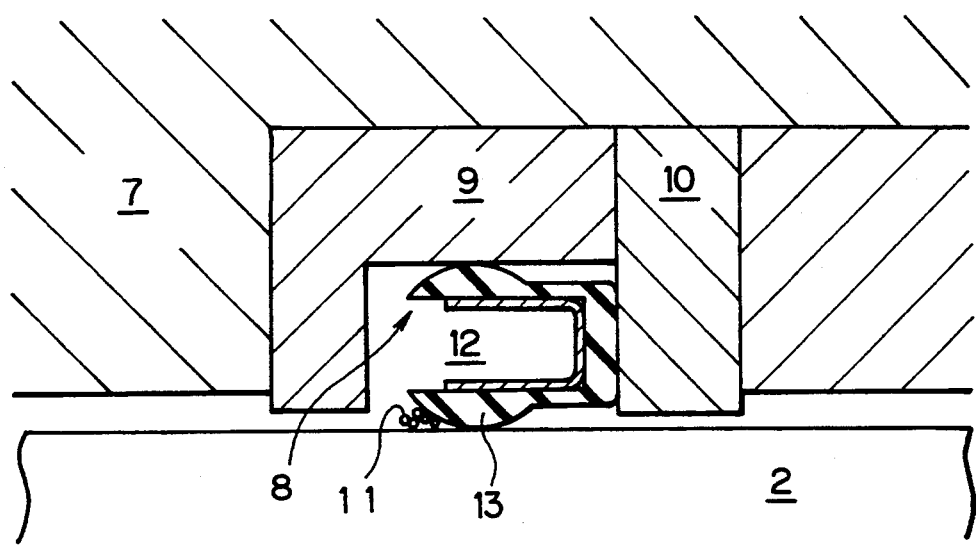
FIG. 5 is an enlarged sectional view of a part of the plunger pump shown in FIG. 4.

As shown in FIG. 3, the dust wiper 61 is accommodated in a recessed portion 62 of the inner periphery 48 of the cylinder 41. The dust wiper 61 has a U-shaped cross section and is annular similar to the seal member 50. The dust wiper 61 is provided, at the radially outward end thereof, with a lip 63 that abuts the inner surface of the recessed portion 62 of the cylinder 41. A lip 64 is provided at the radially inward end of the dust wiper 61. The lip 64 is slidably contacted the outer peripheral surface 49 of the plunger. Because the lip 64 is to be in sliding contact with the outer peripheral surface 49 of the plunger 21, the dust wiper 61 is formed of a synthetic resin material having good slip properties, e.g., a PTFE resin. A spring 65, which also has a U-shaped cross section and is annular, is attached to the inner side of the dust wiper 61 so that the two lips 63 and 64 are pressed by a relatively weak force against the water cylinder 41 and the outer peripheral surface 49 of the plunger, respectively. The dust wiper 61 is set in position with an opening 66 thereof facing toward the seal member 50. The packing casing 52 has an annular projection 67 formed on the end thereof which is closer to the pump chamber C. The annular projection 67 extends into the opening 66, thereby setting the dust wiper 61 in a predetermined position.

Since the opening 66 of the dust wiper 61 faces opposite to the opening 57 of the seal member 50 as described above, during the suction stroke when the plunger 21 moves in the direction of the arrow $F_2$, and the liquid is sucked into the pump chamber C from the suction opening 44 and the pressure in the pump chamber C decreases, a force acts on the dust wiper 61 in such a direction as to tend to enlarge the opening 66. Thus, dust generated at the seal member 50 is prevented from entering the pump chamber C through the area of sliding contact between the outer peripheral surface 49 of the plunger and the lip 64 of the dust wiper 61. In addition, since the pressure in the pump chamber C is low at this time, substantially no dust is generated at the portion of the lip 64 in sliding contact with the plunger 21. Even if dust is generated at this portion, it is sucked in toward the seal member 50 as the plunger 21 moves in the direction of the arrow $F_2$. Accordingly, no dust will comingle with the liquid in the pump chamber C.

On the other hand, during the discharge stroke when the plunger 21 moves in the direction of the arrow $F_1$, the pump chamber C is contracted, and the liquid in the pump chamber C is pressurized to a high level. Accordingly, a force acts on the dust wiper 61 in a direction which causes the opening 66 to narrow. The greater part of the liquid in the pump chamber C is discharged from the discharge opening 46 through the discharge-side check valve 47. However, the high-pressure liquid in the pump chamber C acts on the dust wiper 61 so as to press the lip 64 radially outward at the area of sliding contact between the lip 64 and the outer peripheral surface 49 of the plunger. As a result, a minute gap is formed between the lip 64 and surface 49 as the force pressing the dust wiper 61 to the plunger 21 is reduced. Accordingly, there is no likelihood that new dust will be generated. In addition, part of the liquid in the pump chamber C flows out toward the seal member 50 through the minute gap. Accordingly, there is no possibility that dust generated at the seal member 50, which is a high-pressure seal, will enter the pump chamber C.

In this embodiment, a first discharge means 70, which is capable of controlling the flow rate, is attached to the cylinder 41 for discharging the liquid flowing out from the pump chamber C through the minute gap. The first discharge means 70 has a spill-back discharge opening 71 that extends through both the cylinder 41 and the packing casing 52 so as to communicate with a space S which is delimited radially between the inner peripheral surface of the packing casing 52 and the outer peripheral surface 49 and is delimited axially between the seal member 50 and the dust wiper 61. The first discharge means 70 further has a spill-back line $L_1$ attached to the cylinder 41 in communication with the spill-back discharge opening 71, and a flow limiting orifice $R_1$ interposed in the spill-back line $L_1$. The orifice $R_1$ is capable of controlling the flow rate of the liquid flowing through the spill-back line $L_1$.

During the above-described discharge stroke, the liquid, which flows into the space S from the pump chamber C through the minute gap formed by the dust wiper 61, enters the spill-back discharge opening 71, passes through the flow limiting orifice $R_1$ and is then discharged to the outside through the spill-back line $L_1$. Although the liquid in the space S contains dust generated from a wearing of the sliding contact portion of the seal member 50, since the dust is discharged to the outside through the spill-back line $L_1$ together with the liquid, the liquid in the pump chamber C contains no such dust.

Thus, there is no likelihood, in this embodiment of the plunger pump Pa, of dust generated at the sliding contact portion of the seal member 50 entering the pump chamber C during either of the suction and discharge strokes of the pump. Even if some dust is generated at the sliding contact portion of the dust wiper 61, it will not enter the pump chamber C for the reason described above. Accordingly, there is no possibility of dust comingling with the liquid to be delivered, which is discharged from the pump chamber C through the discharge opening 46.

Further, in this embodiment, a second discharge means 72, which is capable of being opened and closed under control, is attached to the cylinder 41, as shown in FIG. 1, so that it communicates with the pump chamber C to discharge the liquid from the pump chamber C. The second discharge means 72 has a communicating opening 73 which is formed in the side wall of the cylinder 41 in communication with the pump chamber C. The second discharge means 72 further has an overflow line $L_2$ which is attached to the cylinder 41 in communication with the communicating opening 73, and a valve $V_2$ which is provided in the overflow line $L_2$ and which is capable of closing this flow path during the discharge stroke of the pump. Accordingly, if the valve $V_2$ is opened when the plunger pump Pa is in a standby position, that is, a state where the plunger 21 is at rest at the extremity of its travel in the direction of the arrow $F_2$, the liquid continuously flows into the pump chamber C from the suction opening 44 by the pressure in the line connected to the suction opening 44. The liquid flowing in the pump chamber C is continuously discharged to the outside from the overflow line $L_2$ through the communicating opening 73. Thus, the liquid in the pump chamber C is constantly replaced by fresh liquid without stagnating therein. Accordingly, there is no liquation of metal or growth of bacteria in the pump chamber C, and the liquid can be prevented from being contaminated. Thus, the pump having an overflow function provided by the second discharge means 72 is capable of immediately supplying a fresh high-pressure cleaning liquid even after the operation of the pump Pa has been suspended for a long period of time.

By virtue of the above-described structure of the present invention, there is no possibility wear dust, generated at the high-pressure seal, will comingle with the liquid to be delivered during either of the suction and discharge strokes of the pump. Thus, a clean high-pressure liquid can be supplied. In addition, since there is no likelihood that dust generated at the high-pressure seal will wedge into the seal member, the performance of the seal member will not be degraded.

In addition, the second discharge means, which is capable of communicating with the pump chamber for discharging the liquid from the pump chamber, enables a fresh, clean high-pressure liquid to be immediately supplied even after the pump has been out of use a long period of time.

What is claimed is:

1. A plunger pump comprising: a cylinder and a plunger reciprocatable in said cylinder, said cylinder and said plunger defining a pump chamber within the cylinder; a first seal member interposed between an inner surface of said cylinder and an outer surface of said plunger and establishing a seal that inhibits liquid in said pump chamber from leaking from said cylinder past said first seal member; a bearing casing adjacent said cylinder, said bearing casing including a bearing supporting said plunger, and a drain through which liquid having leaked from said cylinder past said first seal member is drained from said plunger pump, the inner surface of said cylinder and the outer surface of said plunger being out of sliding contact with each other so that a gap between said inner and said outer surfaces is defined between said first seal member and said pump chamber and is open to said pump chamber; an annular second seal member located between said first seal member and said pump chamber, said second seal member having a U-shaped cross section such that the second seal member has an annular opening defined between opposed annular legs thereof, said opening of the second seal member facing toward said first seal member so that during a suction stroke in which the plunger is moving in a direction which draws liquid into the pump chamber, said second seal member is in sliding contact with the outer surface of said plunger to prevent dust, resulting from wear, from flowing past the second seal member to the pump chamber, whereas during a discharge stroke in which the plunger is moving in a direction which forces liquid from the pump chamber, a gap is formed between the second seal member and the outer surface of said plunger; and first discharge means located between said second seal member and said first seal member for discharging from the plunger pump liquid flowing from said pump chamber toward said first seal member past said second seal member.

2. A plunger pump as claimed in claim 1, and further comprising second discharge means, including an openable and closable line communicating with said pump chamber, for discharging liquid from said pump chamber when said line is open.

3. A plunger pump as claimed in claim 2, wherein said cylinder has a communicating opening therethrough communicating with said pump chamber, and said second discharge means includes an overflow line attached to said cylinder in communication with said communicating opening and a valve disposed in said overflow line.

4. A plunger pump as claimed in claim 1 or 2, wherein said first seal member is annular and has a U-shaped cross section.

5. A plunger pump as claimed in claim 1 or 2, wherein said cylinder has a recessed portion at the inner periphery thereof, and said second seal member is received in said recessed portion.

6. A plunger pump as claimed in claim 5, wherein said second seal member has two lips on outer portions of said opposed legs thereof, respectively, and further comprising a spring having a U-shaped cross section attached to an inner side of said second seal member, said spring urging said lips of said second seal member against the inner peripheral surface of said cylinder and the outer surface of said plunger.

7. A plunger pump as claimed in claim 6, and further comprising a packing casing provided at the inner periphery of said cylinder, said packing casing supporting said first seal member, said packing casing having an annular projection at one end thereof, and said annular projection extending into the annular opening of said second seal member.

8. A plunger pump as claimed in claim 1 or 2, and further comprising a packing case provided at the inner periphery of said cylinder, said packing casing supporting said first seal member.

9. A plunger pump as claimed in claim 8, wherein said first discharge means controls the flow rate of liquid therethrough.

10. A plunger pump as claimed in claim 9, wherein said cylinder and said packing casing define a spill-back discharge opening extending therethrough, and said first discharge means includes a spill-back line attached to said cylinder in communication with said spill-back discharge opening, and a flow limiting orifice in said spill-back line.

11. A plunger pump as claimed in claim 8, wherein said cylinder has a stepped portion at the inner periphery thereof and said packing casing is secured in said stepped portion in a sealed state.

12. A plunger pump as claimed in claim 11, wherein said packing casing is annular and has a recess therein at the inner periphery thereof, said first seal member being disposed in said recess.

13. A plunger pump as claimed in claim 12, wherein said first seal member has two lips on outer portions of opposed legs thereof, respectively, and further comprising a spring having a U-shaped cross section and attached to an inner side of said first seal member, said spring urging said two lips of said first seal member toward a portion of said packing casing defining said recess and toward the outer surface of said plunger, respectively.

14. A plunger pump as claimed in claim 13, wherein said first seal member has an annular opening defined between the legs thereof and which opening faces toward said pump chamber.

* * * * *